(12) United States Patent
Yamada

(10) Patent No.: US 7,053,574 B2
(45) Date of Patent: May 30, 2006

(54) MIRROR ANGLE CONTROL APPARATUS FOR VEHICULAR ELECTRIC MIRROR ASSEMBLY

(75) Inventor: Ayako Yamada, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/899,058

(22) Filed: Jul. 27, 2004

(65) Prior Publication Data

US 2005/0099149 A1    May 12, 2005

(30) Foreign Application Priority Data

Nov. 7, 2003    (JP) .............................. 2003-378128

(51) Int. Cl.
*B60R 1/072* (2006.01)

(52) U.S. Cl. ........................ 318/470; 318/266; 318/286

(58) Field of Classification Search ................ 318/254, 318/283–286, 466–470, 264–266
See application file for complete search history.

(56) References Cited

U.S. PATENT DOCUMENTS

| | | | | |
|---|---|---|---|---|
| 3,679,954 A * | 7/1972 | Hedrick | ....................... | 318/254 |
| 4,438,398 A * | 3/1984 | Maruo et al. | ................ | 324/173 |
| 4,479,079 A * | 10/1984 | Hanner | ....................... | 388/830 |
| 5,293,104 A | 3/1994 | Dreier | | |
| 5,552,682 A * | 9/1996 | Ushikoshi | ................... | 318/254 |
| 5,631,528 A * | 5/1997 | Agiman | ....................... | 318/293 |
| 5,838,359 A * | 11/1998 | Hoover | ....................... | 347/250 |
| 6,054,791 A * | 4/2000 | Lander | ....................... | 310/233 |
| 6,072,254 A | 6/2000 | Heib et al. | | |
| 6,302,547 B1 * | 10/2001 | Valentino | .................... | 359/843 |
| 6,652,108 B1 * | 11/2003 | Schillegger | ................. | 359/877 |
| 2004/0120059 A1 * | 6/2004 | Motomiya et al. | .......... | 359/877 |

FOREIGN PATENT DOCUMENTS

| | | |
|---|---|---|
| DE | 199 09 233 A1 | 11/1999 |
| FR | 2 807 234 | 10/2001 |
| JP | 2001-138812 | 5/2001 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

As a vertical motion motor (M2) comprised of a brushless motor is driven to rotate in response to a control signal from a main controller (10), a pulse signal generated with the shape corresponding to the number of rotations of the vertical motion motor (M2) is counted by a pulse signal count unit of the main controller (10). Feedback control is exercised over the number of rotations of the vertical motion motor (M2) in accordance with a count value (the number of counts) of the pulse signal, so that mirror surface orientation of a door mirror (2) can be accurately adjusted to tilt downward to a predetermined set angle, and to tilt upward back to a home position angle. A mirror angle control apparatus (1) is provided with high durability and reliability, which can exercise accurate control for a long period of time.

3 Claims, 6 Drawing Sheets

MIRROR ANGLE CONTROL APPARATUS FOR VEHICULAR ELECTRIC MIRROR ASSEMBLY

BACKGROUND OF THE INVENTION

This invention relates generally to mirror angle control apparatuses, and more particularly to a mirror angle control apparatus for controlling an angle of a mirror surface of an electric mirror assembly provided on a vehicle as a door mirror, a fender mirror and the like.

In general, the electric mirror assembly used for a door mirror, a fender mirror or the like in a vehicle accommodates a mirror angle control apparatus which includes a vertical motion driving motor for adjustment of mirror surface orientation upward or downward, a lateral motion driving motor for adjustment of the mirror surface orientation rightward or leftward, and a controller for controlling the number of rotations of each of these driving motors.

The applicant has previously devised, and disclosed in Japanese Laid-Open Patent Application, Publication No. 2001-138812 A, one example of the mirror angle control apparatuses for a vehicular electric mirror assembly, which includes a driving motor comprised of a direct-current brush motor, a motor signal detection means for outputting a pulse signal generated as a result of waveform shaping of a high-frequency motor brush switching signal detected by a pickup coil connected in series with the driving motor, and a pulse signal count means for counting the pulse signal to thereby detect and control the number of rotations of the driving motor.

In this example, since the driving motor is comprised of a direct-current brush motor, the wearing away of the brush, the defective condition in brush contacts, or like circumstance is likely to occur, and thus generates a disadvantageously reduced signal level of the motor brush switching signal. In such a case, the motor brush switching signal cannot be properly wave-shaped, so that a momentary loss (so-called "dropout") of the pulse signal may occur. This resultantly makes it impossible to accurately control the number of rotations of the driving motor, which disadvantageously reduces the accuracy in mirror angle control or adjustment of mirror surface orientation.

SUMMARY OF THE INVENTION

It is one exemplary aspect of the present invention to provide a mirror angle control apparatus for a vehicular electric mirror assembly with high durability and reliability, which can exercise accurate control over the angle (orientation) of a mirror surface for a long period of time, and can thus overcome the above-described disadvantage.

A mirror angle control apparatus for a vehicular electric mirror assembly according to another exemplary and more specific aspect of the present invention includes, but not limited thereto, a driving motor with adjustment functionality of mirror surface orientation, a controller for controlling the number of rotations of the driving motor. The driving motor is comprised of a brushless motor for generating a pulse signal corresponding to the number of rotations of the driving motor. The controller is adapted to control the number of rotations of the brushless motor in accordance with a count value of the pulse signal generated by the brushless motor.

In this apparatus, as the brushless driving motor rotates, a pulse signal corresponding to the number of its rotations is generated. The pulse signal (i.e., the number of pulses thereof) is counted by the controller, and the number of rotations of the brushless motor is controlled by the controller in accordance with the count value, whereby mirror surface orientation is properly adjusted. Since the brushless motor can reliably generate a pulse signal without dropouts for a long period of time, the apparatus as above can exercise accurate control over the mirror surface orientation for a long period of time, so that the durability and reliability of the apparatus can be improved. Moreover, the use of the brushless motor serves to reduce an operation noise, making the apparatus in operation quiet, as well as to reduce a line noise and a radiation noise.

According to yet another aspect of the present invention, a mirror angle control apparatus for a vehicular electric mirror assembly includes, but not limited thereto, a driving motor comprised of a pulse signal generation motor adapted to generate a pulse signal by rotation of a rotary contact fixed on a shaft of the driving motor with a gap to adjustably change an angle of a mirror surface, and a controller for controlling the number of rotations of the driving motor in accordance with a count value of the pulse signal generated by the rotation of the contact.

In this apparatus, as the pulse signal generation-type driving motor rotates, a pulse signal is generated as a result of rotation of the rotary contact fixed on the drive shaft with a gap. The pulse signal is counted by the controller, and the number of rotations of the pulse signal generation motor is controlled by the controller in accordance with the count value, whereby mirror surface orientation is properly adjusted.

In the above apparatuses, the controller may, for example, include: (1) a reference count value setting unit for setting a reference count value as defined by the number of rotations of the driving motor required to change the angle of the mirror surface between a home position angle and a desired set angle; and (2) an excess count value memory unit for storing an excess count value corresponding to the number of extra rotations of the coasting driving motor beyond the reference count value. To be more specific, in the controller, the count value of the pulse signal may preferably but not necessarily be obtained by adding the excess count value to the reference count value.

In these instances, even if the driving motor coasts to tilt the mirror surface beyond the set angle when the mirror surface orientation is to be adjusted from the home position angle to the set angle, the driving motor makes more rotations by the number of rotations the driving motor made during its coasting rotations when the mirror surface orientation is to be adjusted back to the home position angle, so that the mirror surface orientation returns accurately to the home position angle. Consequently, accumulation of angular errors in mirror surface orientation caused by the coasting rotations of the driving motor can be prevented, and thus the mirror surface orientation can be controlled with great accuracy for a long period of time.

The above and other aspects, advantages and further features of the present invention will become readily apparent from the following description of exemplary and non-limiting embodiments with reference to accompanying drawings.

DETAILED DESCRIPTION OF THE EXEMPLARY EMBODIMENTS

A description will hereinafter be given of a mirror angle control apparatus for a vehicular electric mirror assembly according to exemplary embodiments of the present invention with reference to the accompanying drawings.

Figure 1:
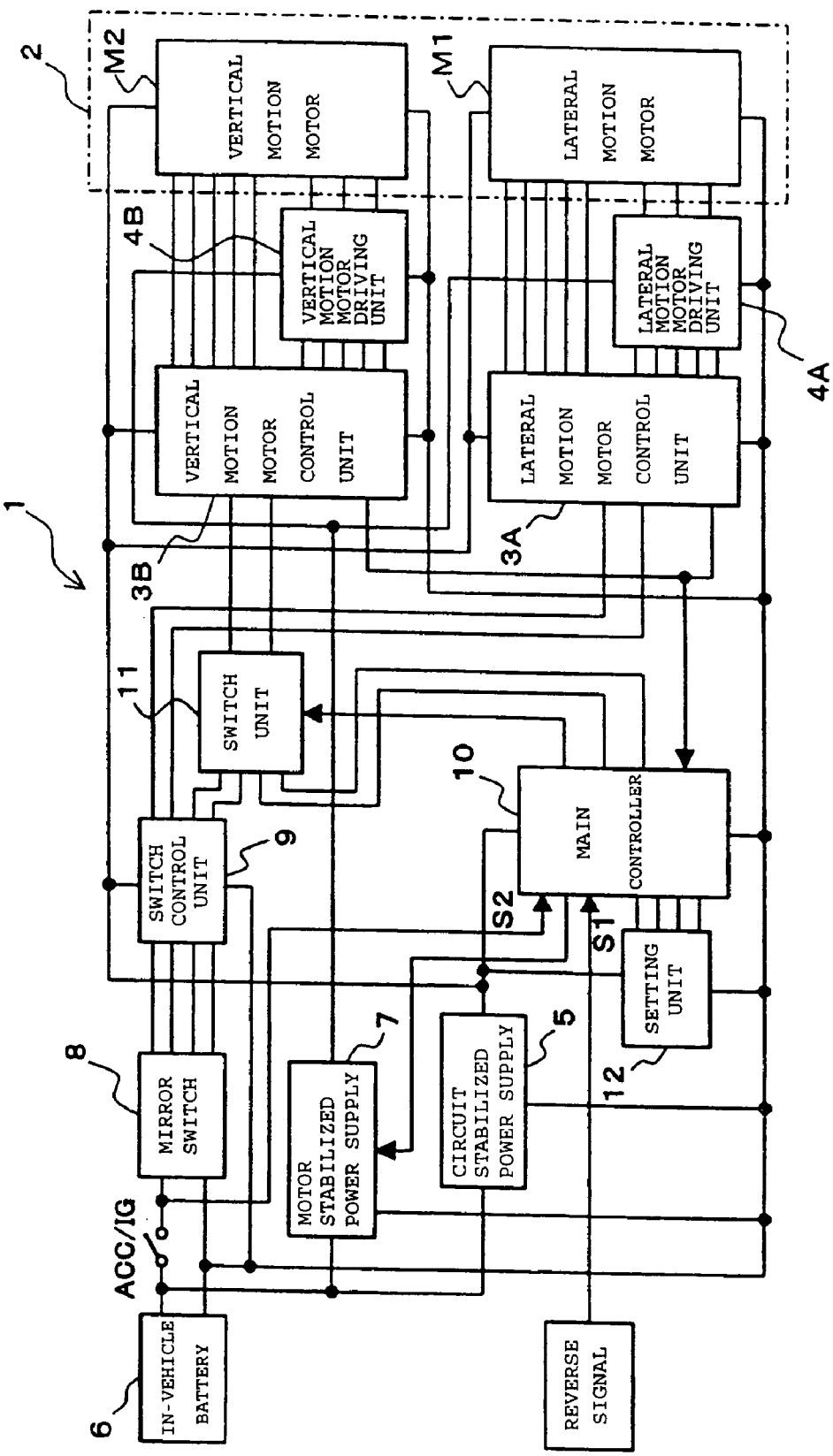
FIG. 1 is a block diagram representing a schematic of a mirror angle control apparatus for a vehicular electric mirror assembly according to an exemplary embodiment of the present invention.

As shown in FIG. 1, a mirror angle control apparatus 1 for a vehicular electric mirror assembly according to an exemplary embodiment of the present invention is an apparatus for controlling the rotations of a lateral motion motor M1 and vertical motion motor M2 included as a driving motor in a door mirror 2 of a vehicle (not shown), to thereby control an angle or orientation of a mirror surface (not shown) of the door mirror 2. The lateral motion motor M1 is configured to adjust mirror surface orientation in a rightward or leftward direction, while the vertical motion motor M2 is configured to adjust the mirror surface orientation in an upward or downward direction.

Figure 2:
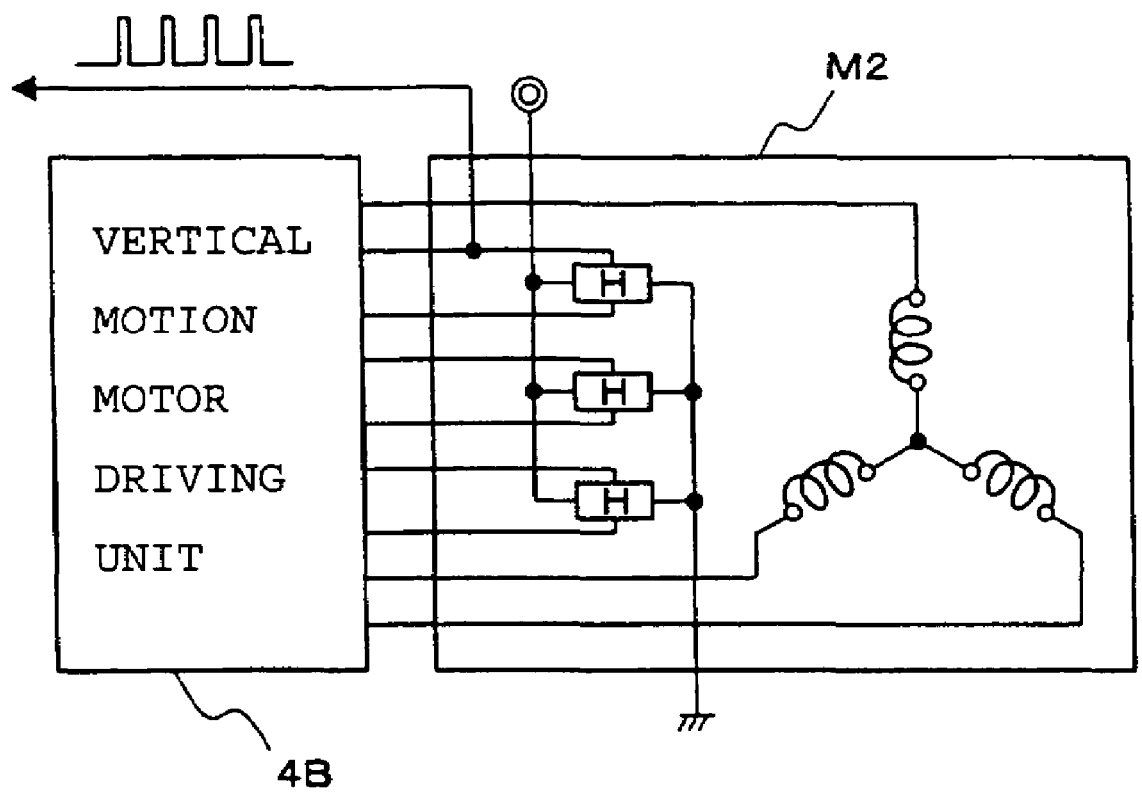
FIG. 2 is a connection diagram representing a schematic of a vertical motion motor as shown in FIG. 1.

As shown in FIG. 2, the vertical motion motor M2 is comprised of a three-phase brushless motor having three Hall elements H for sensing the rotational position of a rotor (not shown), and the Hall elements H are adapted to generate a pulse signal as the rotor rotates. The pulse signal is output to a vertical motion motor control unit 3B. The lateral motion motor M1 is, like the vertical motion motor M2, comprised of a brushless motor having the same construction as described above in conjunction with the vertical motion motor M2.

Referring again to FIG. 1, rotation of the lateral motion motor M1 is controlled, through a lateral motion motor driving unit 4A which includes a power FET bridge circuit and other circuit elements, by a lateral motion motor control unit 3A which outputs a PWM signal. Similarly, rotation of the vertical motion motor M2 is controlled, through a vertical motion motor driving unit 4B which includes a power FET bridge circuit and other circuit elements, by a vertical motion motor control unit 3B which outputs a PWM signal.

The lateral motion motor control unit 3A and vertical motion motor control unit 3B are connected with an in-vehicle battery 6 through a circuit stabilized power supply 5 for stabilizing a voltage to be applied. The lateral motion motor driving unit 4A and vertical motion motor driving unit 4B are connected with the in-vehicle battery 6 through a motor stabilized power supply 7 for stabilizing a voltage to be applied. The motor stabilized power supply 7 is adapted to be turned off synchronously when an ignition switch ACC/IG is turned off, under control of a main controller that transmits a control signal to the motor stabilized power supply 7 as will be described later, for the purpose of reducing a dark current.

In order to control the rotation of the lateral motion motor M1 and vertical motion motor M2 in accordance with an operation by a driver in the vehicle (not shown), there are provided a mirror switch 8 manipulated by the driver, and a switch control unit 9 which receives a switching signal from the mirror switch 8, and the mirror switch 8 and the switch control unit 9 are connected with the in-vehicle battery 6 through the ignition switch ACC/IG. Further, in order to control the rotation of the vertical motion motor M2 alone on the basis of the output of a reverse signal S1 which is turned on in response to the operation of a shift lever (not shown) of the vehicle into reverse gear and which is turned off in response to the operation thereof out of the reverse gear, a main controller 10 and a switch unit 11 are provided.

The switch control unit 9 is configured to output to the lateral motion motor control unit 3A or vertical motion motor control unit 3B a control signal for driving the lateral motion motor M1 or vertical motion motor M2 to rotate in a normal or reverse direction in accordance with operator's manual intervention with the mirror switch 8. The control signal from the switch control unit 9 is output directly to the lateral motion motor control unit 3A so as to have the lateral motion motor M1 placed at all times under control, but is output to the vertical motion motor control unit 3B indirectly through the switch unit 11.

The main controller 10 is connected through the above circuit stabilized power supply 5 with the in-vehicle battery 6. The main controller 10 is configured to output to the switch unit 11 a control signal for driving the vertical motion motor M2 to rotate in a normal or reverse direction according to whether the reverse signal S1 is ON or OFF. At this stage, the main controller 10 also outputs a switching signal to the switch unit 11 so that the control signal transmitted to the switch unit 11 is output to the vertical motion motor control unit 3B.

While the ignition switch ACC/IG is being activated to keep the power on, the main controller 10, on receiving the reverse signal S1, controls the vertical motion motor M2 to rotate in the normal direction so that the mirror surface orientation of the door mirror 2 is adjusted to tilt down from a home position angle to a set angle at which the driver is provided with a view of the area near a rear wheel of the vehicle (not shown). On the other hand, the main controller 10, which has stopped receiving the reverse signal S1, controls the vertical motion motor M2 to rotate in the reverse direction so that the mirror surface orientation of the door mirror 2 is adjusted to tilt back from the set angle to the home position angle.

To this end, the main controller 10 is connected with a setting unit 12 for adaptively determining the set angle at which the mirror surface orientation is tilted down on receiving the reverse signal S1 and an ignition switch signal S2. Hereupon, the ignition switch signal S2 is a signal indicative of the state of the ignition switch ACC/IG, i.e., whether the ignition switch ACC/IG is on or off, and is output when the ignition switch ACC/IG is activated in the on state. The setting unit 12 is comprised of an external switch such as a switch assembly of DIP switches manipulative from outside by manual operation. Through the setting unit 12, the numbers of rotations of the vertical motion motor M2 corresponding to the set angles of two mirrors A and B having different gear ratios of mirror driving systems thereof can be configured in several ways as shown in TABLE 1 below:

TABLE 1

| Setting | DIP Switch Assembly | | | | Set Number | | |
|---|---|---|---|---|---|---|---|
| No. | 1 | 2 | 3 | 4 | of Rotations | Mirror A | Mirror B |
| 1 | OFF | OFF | OFF | — | 100 | 2.0° | 1.5° |
| 2 | ON | OFF | OFF | — | 200 | 2.5° | 2.0° |
| 3 | OFF | ON | OFF | — | 300 | 3.0° | 2.5° |
| 4 | ON | ON | OFF | — | 400 | 3.5° | 3.0° |
| 5 | OFF | OFF | ON | — | 500 | 4.0° | 3.5° |
| 6 | ON | OFF | ON | — | 600 | 4.5° | 4.0° |
| 7 | OFF | ON | ON | — | 700 | 5.0° | 4.5° |
| 8 | ON | ON | ON | — | 800 | 5.5° | 5.0° |

Figure 3:
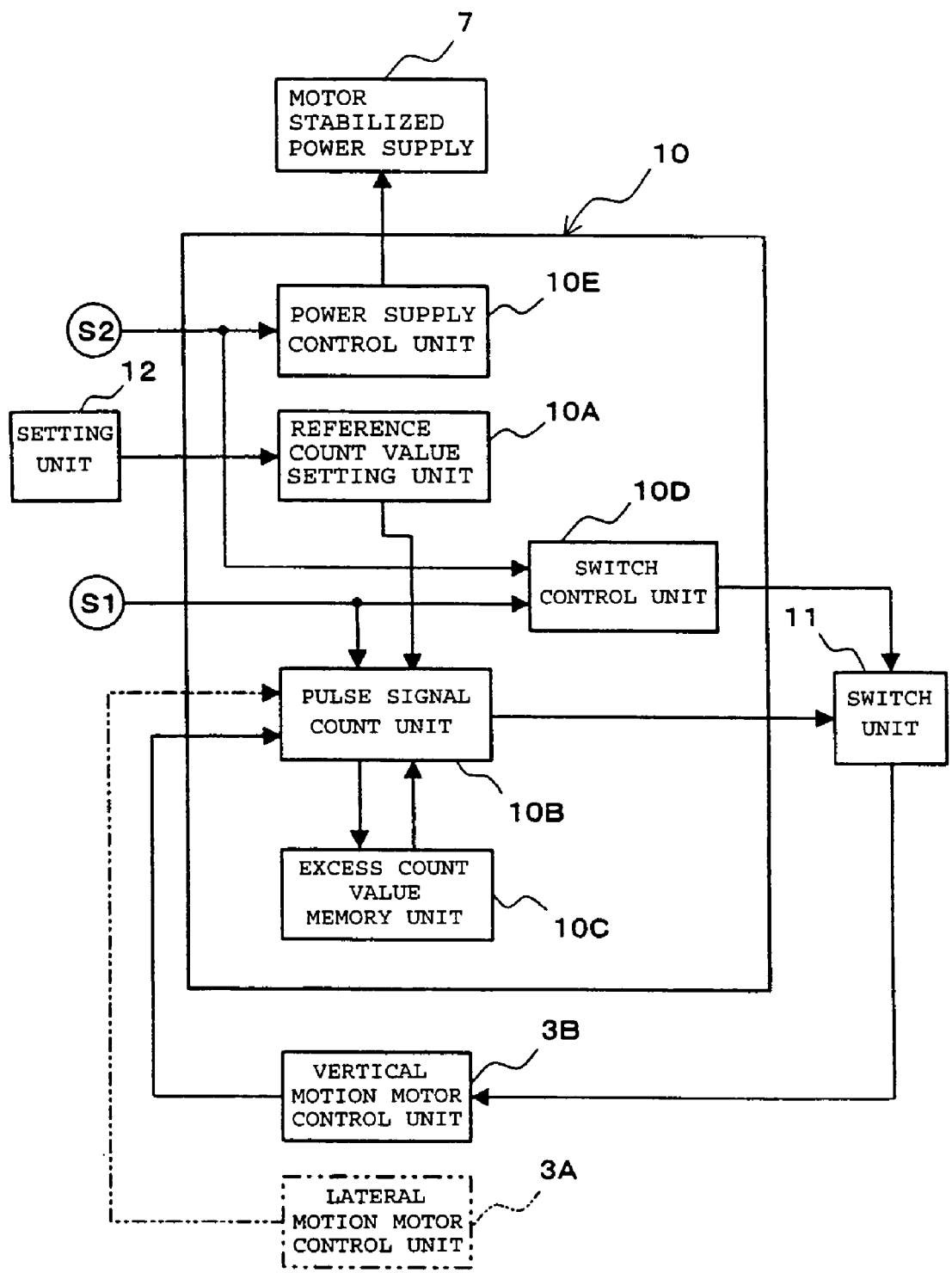
FIG. 3 is a block diagram representing functions of a main controller as shown in FIG. 1.

The main controller 10 (see FIG. 1) is constructed by utilizing hardware and software of a microcomputer which typically includes but is not limited to a central processing unit (CPU), a read only memory (ROM), a random access memory (RAM), etc. More specifically, as shown in FIG. 3, the main controller 10 includes, as principal software components, not only a reference count value setting unit 10A to which a setting signal is input from the setting unit 12, but also a pulse signal count unit 10B, an excess count value memory unit 10C, a switch control unit 10D, and a power supply control unit 10E.

The reference count value setting unit 10A, when receiving a set signal indicative of the set number of rotations of the vertical motion motor M2 from the setting unit 12, updates the reference count value with the number of pulses of the pulse signal corresponding to the set number of rotations. The reference count value corresponds to the reference number of rotations the vertical motion motor M2 makes when the mirror surface orientation of the door mirror 2 is adjusted to tilt down from the home position angle to the predetermined set angle so that the driver is provided with a view of the area near a rear wheel of the vehicle.

The pulse signal count unit 10B receives a reverse signal S1. The pulse signal count unit 10B outputs to the switch unit 11 a control signal instructing the vertical motion motor M2 to rotate normally when the reverse signal S1 is turned on, and outputs to the switch unit 11 a control signal instructing the vertical motion motor M2 to rotate reversely when the reverse signal S1 is turned off.

Moreover, the pulse signal count unit 10B receives through the vertical motion motor control unit 3B a pulse signal output from the vertical motion motor M2 comprised of a brushless motor. The pulse signal count unit 10B counts the number of pulses of the thus-received pulse signal so as to exercise feedback control over the number of rotations of the vertical motion motor M2. Once the counted number of pulses reaches the reference count value loaded from the reference count value setting unit 10, the pulse signal count unit 10B outputs to the switch unit 11 a control signal instructing the vertical motion motor M2 to stop rotating. Thereafter, if the counted number of pulses exceeds the reference count value, the excessively counted number of pulses is stored in the excess count value memory unit 10C as an excess count value corresponding to the number of extra rotations of the coasting vertical motion motor M2.

The switch control unit 10D receives a reverse signal S1 and an ignition switch signal S2. The switch control unit 10D outputs a switching signal to the switch unit 11 when receiving the reverse signal S1 with the ignition switch signal S2 kept on.

The power supply control unit 10E turns the motor stabilized power supply 7 on when the ignition switch signal S2 is turned on, and turns the motor stabilized power supply 7 off to reduce a dark current when the ignition switch signal S2 is turned off.

In the mirror angle control apparatus 1 according to the above-described embodiment of the present invention, when the driver of the vehicle (not shown) turns the ignition switch ACC/IG on, the ignition switch signal S2 is turned on and transmitted to the power supply control unit 10E of the main controller 10, and the power supply control unit 10E turns the motor stabilized power supply 7 on. As a result, the lateral motion motor driving unit 4A and the vertical motion motor driving unit 4B are connected with the motor stabilized power supply 7, so that the lateral motion motor M1 and the vertical motion motor M2 may be energized and become ready to be activated.

In this situation, when the driver manipulates the mirror switch 8 to adjust the lateral orientation of the mirror surface of the door mirror 2 to an adequate angle as the driver desires, a switching signal is transmitted from the mirror switch 8 through the switch control unit 9 to the lateral motion motor control unit 3A, making the lateral motion motor M1 rotate in a normal or reverse direction, so that the mirror surface orientation of the door mirror 2 is adjusted to the right or to the left. Further, when the driver manipulates the mirror switch 8 to adjust the vertical orientation of the mirror surface of the door mirror 2 to an adequate angle as the driver desires, a switching signal is transmitted from the mirror switch 8 through the switch control unit 9 and the switch unit 11 to the vertical motion motor control unit 3B, making the vertical motion motor M2 rotate in a normal or reverse direction, so that the mirror surface orientation of the door mirror 2 is adjusted upward or downward.

Figure 4:
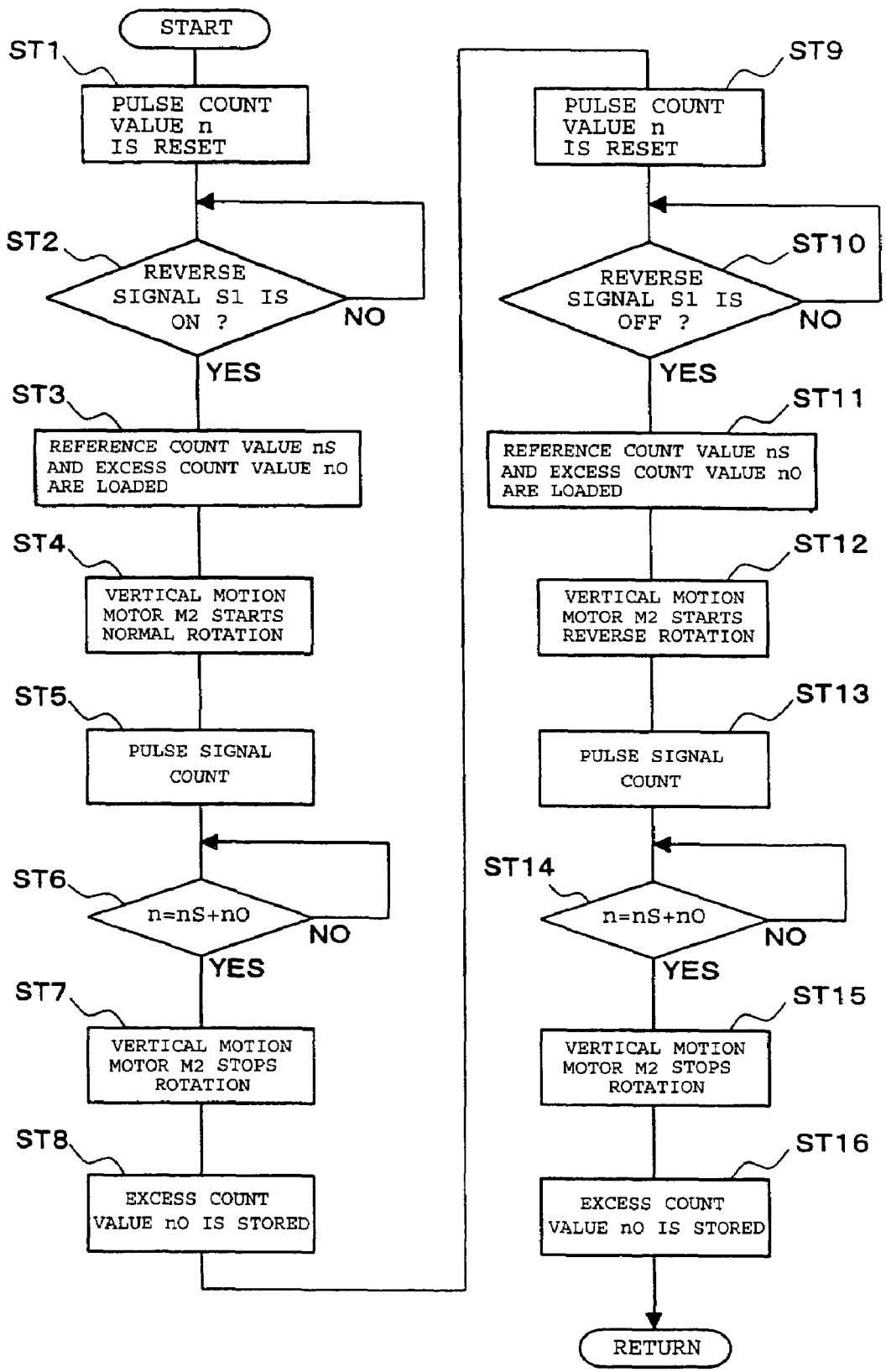
FIG. 4 is a flowchart representing a series of process steps performed by the main controller as shown in FIG. 3.

If the driver operates the shift lever (not shown) of the vehicle into reverse gear, the reverse signal S1 is turned on, and an ON signal is transmitted to the main controller 10. In response thereto, the main controller 10 controls the rotation of the vertical motion motor M2, by following the process steps as shown in the flowchart of FIG. 4.

At the outset, a count value n of the pulse signal which the pulse signal count unit 10B outputs is reset (ST1). Next, determination as to whether the reverse signal S1 is turned on is repeated until YES is returned as a result of the determination (ST2).

If an ON signal of the reverse signal S1 is input to the switch control unit 10D and pulse signal count unit 10B of the main controller 10, YES is returned as a result of the determination in step ST2, and a reference count value nS preset in the reference count value setting unit 10A and an excess count value nO stored in the excess count value memory unit 10C are then loaded, in step ST3, into the pulse signal count unit 10B.

In subsequent step ST4, the vertical motion motor M2 is driven to rotate in a normal direction by the following process steps. First, in response to the ON signal of the reverse signal S1 input to the pulse signal count unit 10B, the pulse signal count unit 10B outputs a control signal for instructing the vertical motion motor M2 to rotate in the normal direction to the switch unit 11. Moreover, in response to the same ON signal of the reverse signal S1 also input to the switch control unit 10D, the switch control unit 10D outputs to the switch unit 11 a switching signal for instructing the switch unit 11 to forward the control signal received from the pulse signal count unit 10B by the switch unit 11 to the vertical motion motor control unit 3B. Accordingly, the vertical motion motor M2 starts rotating in the normal direction so as to adjust the mirror surface orientation downward from the home position angle (at which the driver is provided with a rearward view during normal operation of driving the vehicle forward) to the set angle (at which the driver is provided with a view of the area near a rear wheel of the vehicle upon reversing the vehicle).

When the vertical motion motor M2 starts rotating in the normal direction, the pulse signal generated with its rotation is transmitted through the vertical motion motor control unit 3B to the pulse signal count unit 10B. The pulse signal count unit 10B then counts the number of pulses of the pulse signal (ST5).

Subsequently in step ST6, it is determined whether or not the count value n or the number of pulses counted by the pulse signal count unit 10B has reached a value obtained by adding the excess count value nO to the reference count value nS. This step is repeated until YES is returned as a result of the determination.

If YES is returned as a result of the determination in step ST6, the pulse signal count unit 10B outputs a control signal for instructing the vertical motion motor M2 to stop rotating through the switch unit 11 to the vertical motion motor control unit 3B. Consequently, the vertical motion motor M2 stops rotating, and the mirror surface orientation of the door mirror 2 is adjusted to tilt at the set angle (at which the driver is provided with a view of the area near a rear wheel of the vehicle upon reversing the vehicle) (ST7).

At this stage, the vertical motion motor M2 is likely to coast and make a specific number of extra rotations by the time when it stops rotating. In subsequent step ST8, thus, a count value of the number of pulses which exceeds the reference count value is output, as an updated excess count value nO of the rotations the coasting vertical motion motor M2 has made, from the pulse signal count unit 10B to the excess count value memory unit 10C. The excess count value nO is then stored in the excess count value memory unit 10C.

Next, in step ST9, prior to the reverse rotations of the vertical motion motor M2 to return the mirror surface orientation of the door mirror 2 to the home position angle, the count value n of the pulse signal in the pulse signal count unit 10B is reset. Thereafter, it is determined whether the reverse signal S1 is turned off (ST10). This step of determination is repeated until YES is returned.

Assuming that the driver operates the shift lever (not shown) of the vehicle from the reverse gear position to the other position such as neutral, parking, etc., the reverse signal S1 transmitted to the main controller 10 is turned off, and YES is returned as a result of determination in step ST10. Otherwise, if the driver turns the ignition switch ACC/IG off, the reverse signal S1 transmitted to the main controller 10 is turned off, and thus YES is returned in the determination step ST10.

Subsequently, in step ST11, the reference count value nS set in the reference count value setting unit 10A and the excess count value nO now stored in the excess count value memory unit 10C are loaded into the pulse signal count unit 10B.

Next, in step ST12, the reverse signal S1 transmitted to the pulse signal count unit 10B is turned off, and thus the pulse signal count unit 10B outputs a control signal for instructing the vertical motion motor M2 to rotate in the reverse direction through the switch unit 11 to the vertical motion motor control unit 3B. Consequently, the vertical motion motor M2 starts rotating in the reverse direction so as to make the mirror surface orientation of the door mirror 2 tilt upward from the set angle (at which the driver is provided with a view of the area near a rear wheel of the vehicle upon reversing the vehicle) back to the home position angle (at which the driver is provided with a rearward view during normal operation of driving the vehicle forward).

When the vertical motion motor M2 starts rotating in the reverse direction, the pulse signal generated with the rotation of the vertical motion motor M2 is transmitted through the vertical motion motor control unit 3B and input to the pulse signal count unit 10B. The pulse signal count unit 10B counts the number of pulses in the input pulse signal (ST13).

Subsequently, in step ST14, it is determined whether a count value n of the number of pulses counted in the pulse signal count unit 10B has reached a value obtained by adding the updated excess count value nO to the reference count value nS. This step of determination is repeated until YES is returned as a result of determination.

If the determination in step ST14 results in YES, a control signal for instructing the vertical motion motor M2 to stop rotating is output from the pulse signal count unit 10B, and transmitted through the switch unit 11 to the vertical motion motor control unit 3B. Consequently, the vertical motion motor M2 stops rotating, and the mirror surface orientation of the door mirror 2 is adjusted back to the home position angle (at which the driver is provided with a rearward view during normal operation of driving the vehicle forward) (ST15).

Lastly, in step ST16, the count value of the number of pulses exceeding the reference count value is output from the pulse signal count unit 10B to the excess count value memory unit 10C as an updated excess count value nO of extra rotations the coasting vertical motion motor M2 makes. The excess count value memory unit 10C thus stores the excess count value nO.

As described above, in the mirror angle control apparatus 1 according to an exemplary embodiment of the present invention, when the vertical motion motor M2 comprised of a brushless motor is driven to rotate in response to a control signal from the main controller 10, the pulse signal generated in accordance with the number of rotations thereof is counted by the pulse signal count unit 10B of the main controller 10. Feedback control based upon the count value of the pulse signal is exercised over the number of rotations of the vertical motion motor M2, whereby the mirror surface orientation of the door mirror 2 is adequately adjusted to tilt downward to a predetermined set angle and to tilt upward back to the home position angle.

In this operation, even if the vertical motion motor M2 coasts to make extra rotations, the vertical motion motor M2 is driven to make an additional number of reverse rotations corresponding to the extra rotations of the vertical motion motor M2 when the mirror surface orientation is adjusted from the set angle back to the home position angle, so that the mirror surface orientation is precisely restored back to the home position angle.

Figure 5:
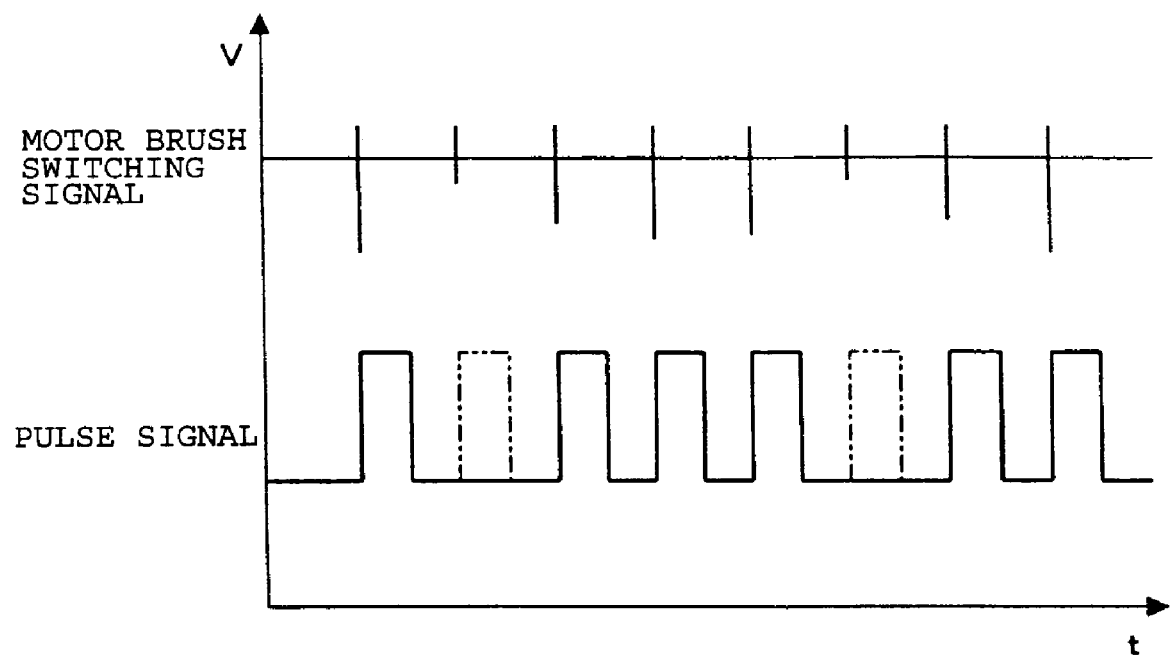
FIG. 5 is a graph showing in contrast waveforms of a motor brush switching signal generated by a direct-current brush motor and a pulse signal obtained as a result of wave shaping of the motor brush switching signal.

In a case where the vertical motion motor M2 is, as is the case with the conventional mirror angle control apparatus, comprised of a direct-current brush motor, a reduced signal level of the motor brush switching signal is likely to be generated due to wearing away of the brush, defective condition in brush contacts, or the like. In this instance, the motor brush switching signal cannot be properly wave-shaped, so that a momentary loss (so-called "dropout") of the pulse signal is likely to occur (see FIG. 5). This resultantly makes it impossible to accurately exercise feedback control over the vertical motion motor M2, which disadvantageously reduces the accuracy in adjustment of mirror surface orientation.

Figure 6:
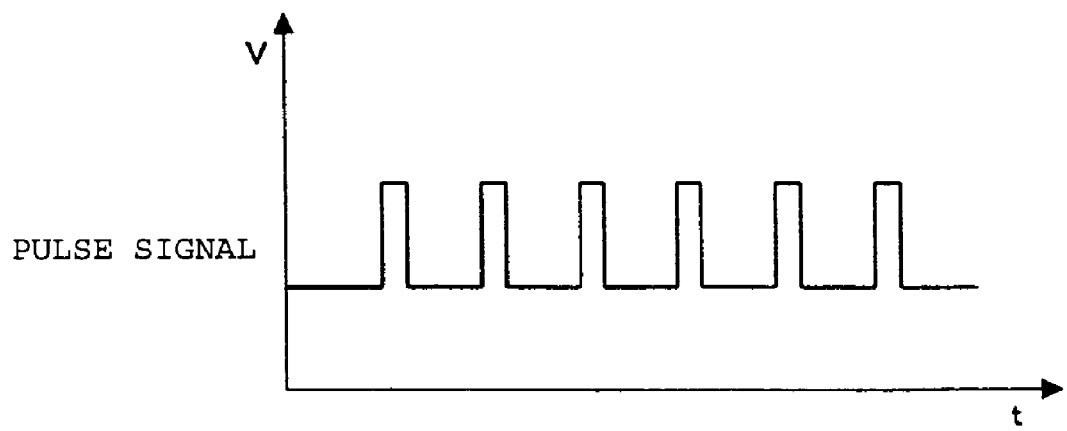
FIG. 6 is a graph showing a waveform of a pulse signal generated by a brushless motor used as a vertical motion motor in FIG. 2.

In contrast, the mirror angle control apparatus 1 according to an exemplary embodiment of the present invention as described above, which has the vertical motion motor M2 comprised of a brushless motor capable of reliably generating a pulse signal without momentary loss for a long period of time as shown in FIG. 6, can precisely control the mirror surface orientation of the door mirror 2 for a long period of time, thus achieving improved durability and reliability. Moreover, the use of the brushless motor serves to reduce an operation noise, making the apparatus in operation quiet, as well as to reduce a line noise and a radiation noise.

Although the exemplary and non-limiting embodiment of the present invention has been described above, various modifications and changes may be made in the present invention without departing from the spirit and scope thereof. For example, the mirror surface orientation of the door mirror 2 may be adjusted to the right or to the left in synchronization with a manual switching operation of the blinker of the vehicle performed by the driver. In this instance, a right or left blinker signal is generated, and the blinker signal like a reverse signal S1 is transmitted to the main controller 10. A control signal is then output from the pulse signal count unit 10B of the main controller 10, and transmitted through the switch unit 11 to the lateral motion motor control unit 3A, so that feedback control may be exercised over the rotation of the lateral motion motor M1.

Figure 7:
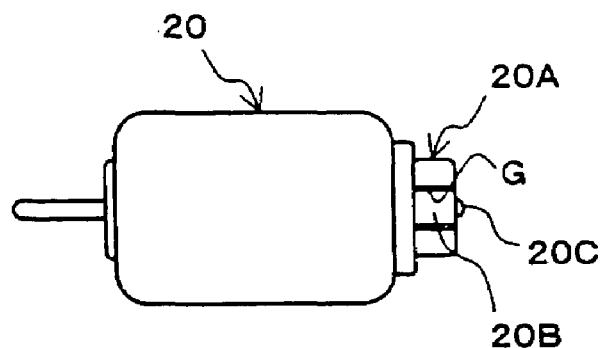
FIG. 7 is a schematic side elevation of a pulse signal generation motor as a variation of the vertical motion motor of FIG. 2.
Figure 8:
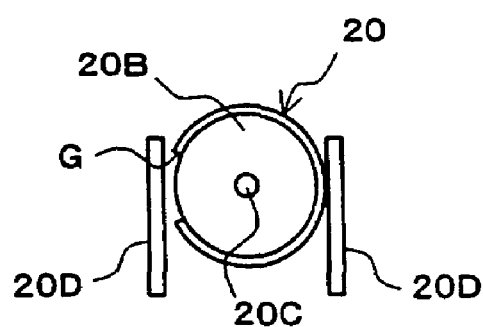
FIG. 8 is a schematic front elevation of the pulse signal generation motor shown in FIG. 7.
Figure 9:
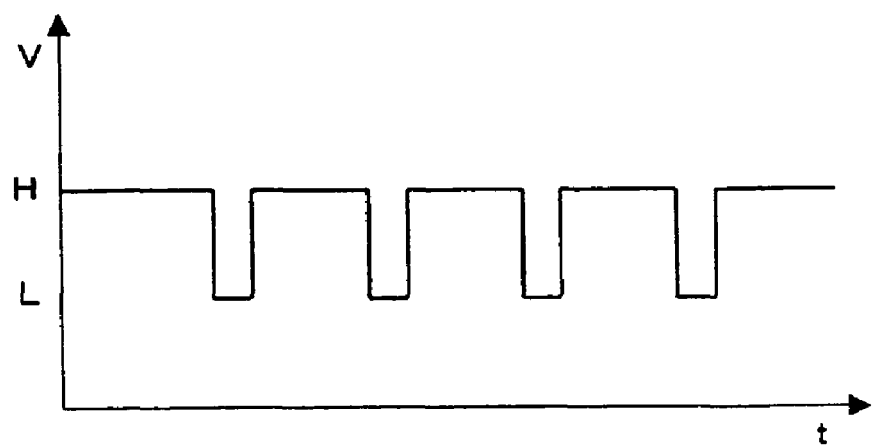
FIG. 9 is a graph showing a waveform of a pulse signal generated by the pulse signal generation motor shown in FIGS. 7 and 8.

Moreover, the vertical motion motor M2 applicable for the present invention may not be limited to one comprised of a brushless motor, but those comprised of a pulse signal generation motor 20 as shown in FIGS. 7 and 8 may be used instead. This pulse signal generation motor 20 may include a rotary contact 20A fixed around the periphery of a rotary shaft 20C with an insulating bush 20B stuffed therebetween, and a gap G formed to extend partly but somewhat widely in a circumferential direction. On the periphery of the rotary contact 20A with gap G are provided a pair of brushes 20D for acquiring a pulse signal. The brushes 20D sandwich the rotary contact 20A with gap G from opposite sides and slidably come in contact with the same. In this pulse signal generation motor 20, as the rotary contact 20A with gap G rotates together with the rotary shaft 20C, a pulse signal exhibiting low levels L at times when the gap G comes to the brush 20D as shown in FIG. 9 is picked up through the paired brush 20D.

What is claimed is:

1. A mirror angle control apparatus for a vehicular electric mirror assembly, the apparatus comprising:
    a driving motor comprised of a pulse signal generation motor adapted to generate a pulse signal by rotation of a rotary contact fixed on a shaft of the driving motor with a gap to adjustably change an angle of a mirror surface; and
    a controller for controlling the number of rotations of the driving motor in accordance with a count value of the pulse signal generated by the rotation of the contact.

2. The apparatus according to claim 1, wherein the controller comprises:
    a reference count value setting unit for setting a reference count value as defined by the number of rotations of the driving motor required to change the angle of the mirror surface between a home position angle and a desired set angle; and
    an excess count value memory unit for storing an excess count value corresponding to the number of extra rotations of the coasting driving motor beyond the reference count value,
    wherein the count value of the pulse signal is obtained by adding the excess count value to the reference count value.

3. The apparatus according to claim 2, wherein the reference count value is adjustable through manual intervention with an external switch.

* * * * *